(12) United States Patent
Schultz et al.

(10) Patent No.: US 6,617,511 B2
(45) Date of Patent: Sep. 9, 2003

(54) PREWIRED ELECTRICAL APPARATUS HAVING QUICK CONNECT COMPONENTS

(76) Inventors: James Douglas Schultz, 2386 Dundee Cir., South Lake Tahoe, CA (US) 96150; Michael Henry Weber, 2163 Inverness Dr., South Lake Tahoe, CA (US) 96150; Gary Lee Petrak, 1148 Salinas, Costa Mesa, CA (US) 92626; Ronald D. Shaw, 1401 Outrigger, Corona del Mar, CA (US) 92625

(*) Notice: Subject to any disclaimer, the term of this patent is extended or adjusted under 35 U.S.C. 154(b) by 0 days.

(21) Appl. No.: 10/198,567

(22) Filed: Jul. 18, 2002

(65) Prior Publication Data

US 2002/0185296 A1 Dec. 12, 2002

Related U.S. Application Data

(63) Continuation-in-part of application No. 09/479,632, filed on Jan. 7, 2000, now abandoned.

(51) Int. Cl.[7] ................................................. H02G 3/08
(52) U.S. Cl. .............................. 174/53; 174/50; 174/57; 220/3.2
(58) Field of Search ............................... 174/53, 50, 59, 174/51, 48, 65 R, 57, 58, 66, 60; 220/3.2, 3.3, 3.7, 3.92, 3.94, 4.01, 4.02, 3.6

(56) References Cited

U.S. PATENT DOCUMENTS

| | | | | | |
|---|---|---|---|---|---|
| 2,397,688 | A | * | 4/1946 | Werner | ............................ 174/53 |
| 2,433,917 | A | * | 1/1948 | McCartney | .................... 174/50 |
| 2,920,303 | A | * | 1/1960 | Johnson | ........................ 174/53 |
| 3,038,141 | A | * | 6/1962 | Chiuchiolo | ..................... 174/53 |
| 3,510,822 | A | * | 5/1970 | Patterson | ...................... 174/51 |
| 3,609,647 | A | * | 9/1971 | Castellano | .................... 174/53 |
| 3,716,651 | A | * | 2/1973 | Werner | ......................... 174/53 |
| 3,814,834 | A | * | 6/1974 | Glader | .......................... 174/57 |

(List continued on next page.)

Primary Examiner—Dean A. Reichard
Assistant Examiner—Angel R. Estrada
(74) Attorney, Agent, or Firm—Stetina Brunda Garred & Brucker

(57) ABSTRACT

A power distribution system, suitable for use in a building is provided, having a junction box, a hub, a junction device, and a cover plate. Wiring from the building is connected to the hub using various alternatives such as stab-in connections, set screws, or loop screws, and color coding facilitates proper wiring. Also, the junction device is a modular piece that can be attached to the junction box via interference there between. Furthermore, a cover plate can be attached to the junction device via interference there between, or the cover plate can be integrally attached to the junction device. The hub can accommodate circuitry that functions with the junction device while simultaneously accommodating circuitry wholly independent of the junction device. As such, the power distribution system enables wiring to be completed more quickly and accurately, in a wider variety of applications, thereby advantageously reducing associated costs.

17 Claims, 5 Drawing Sheets

U.S. PATENT DOCUMENTS

| | | | |
|---|---|---|---|
| 3,879,101 A | * | 4/1975 | McKissic .................... 439/535 |
| 3,922,478 A | * | 11/1975 | Perkey ........................ 174/53 |
| 3,926,330 A | | 12/1975 | Deming et al. |
| 4,135,337 A | | 1/1979 | Medlin |
| 4,165,443 A | * | 8/1979 | Figart et al. .................. 174/53 |
| 4,336,418 A | | 6/1982 | Hoag |
| 4,780,088 A | * | 10/1988 | Means ........................ 439/107 |
| 4,918,258 A | | 4/1990 | Ayer |
| 4,924,032 A | | 5/1990 | Akins |
| 5,326,933 A | | 7/1994 | Freundner |
| 5,399,806 A | * | 3/1995 | Olson ........................ 174/53 |
| 5,471,012 A | * | 11/1995 | Opel .......................... 174/53 |
| 5,525,754 A | * | 6/1996 | Akins ......................... 174/53 |
| 5,639,991 A | | 6/1997 | Schuette |
| 5,735,710 A | * | 4/1998 | Blaauboer et al. .......... 439/535 |
| 5,762,525 A | | 6/1998 | Candeloro |
| 5,770,817 A | | 6/1998 | Lo |
| 5,785,551 A | | 7/1998 | Libby |
| 5,925,850 A | | 7/1999 | Park |
| 5,965,846 A | * | 10/1999 | Shotey et al. ................. 174/66 |
| 6,201,187 B1 | * | 3/2001 | Burbine ........................ 174/53 |
| 6,215,066 B1 | * | 4/2001 | Kelso et al. .................. 174/66 |
| 6,281,438 B1 | * | 8/2001 | Desilets et al. ............... 174/53 |
| 6,309,248 B1 | * | 10/2001 | King .......................... 361/42 |
| 6,361,333 B1 | * | 3/2002 | Cash, Jr. ..................... 439/106 |
| 6,435,903 B1 | * | 8/2002 | Nelson ........................ 174/57 |

* cited by examiner

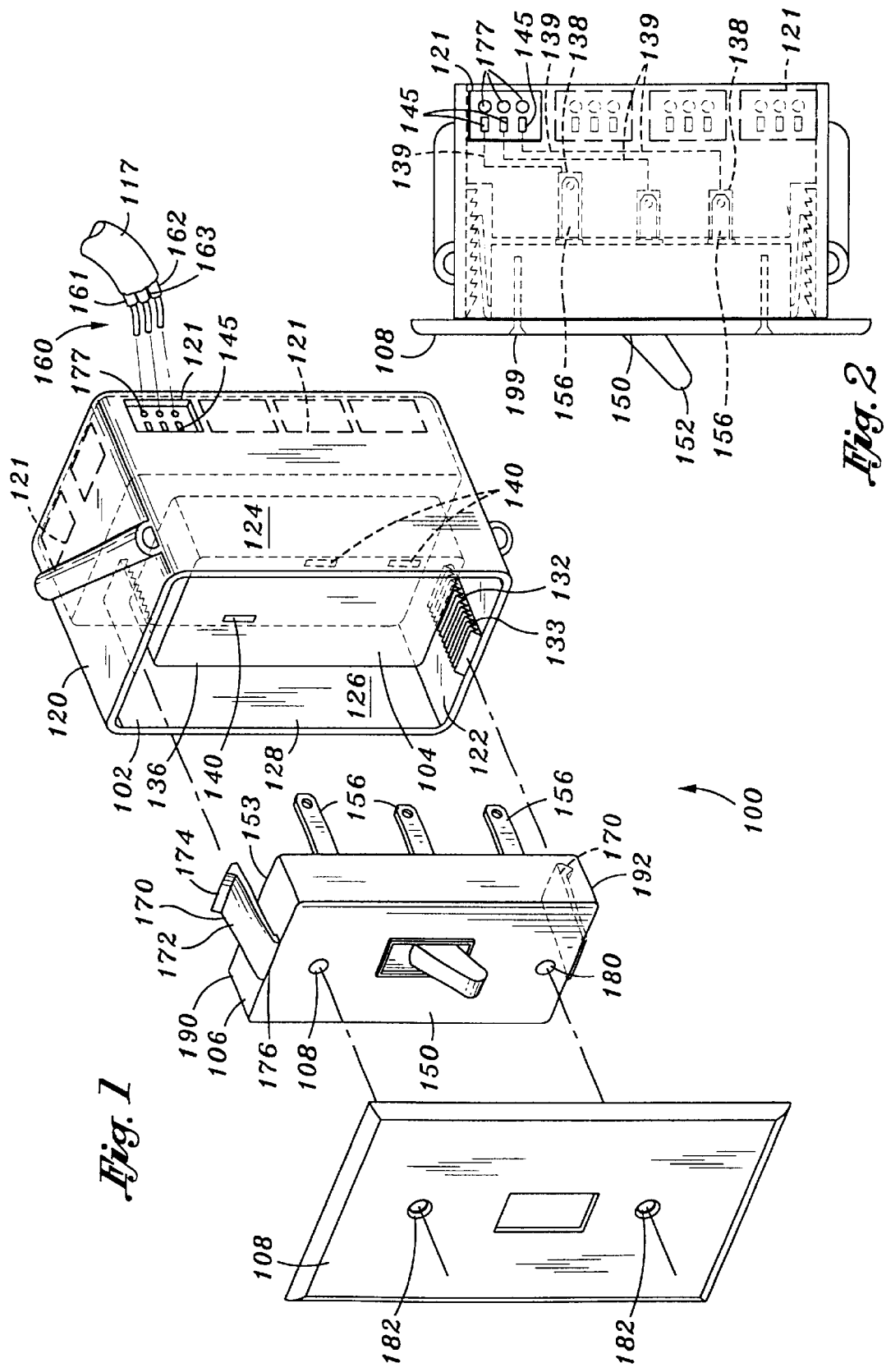

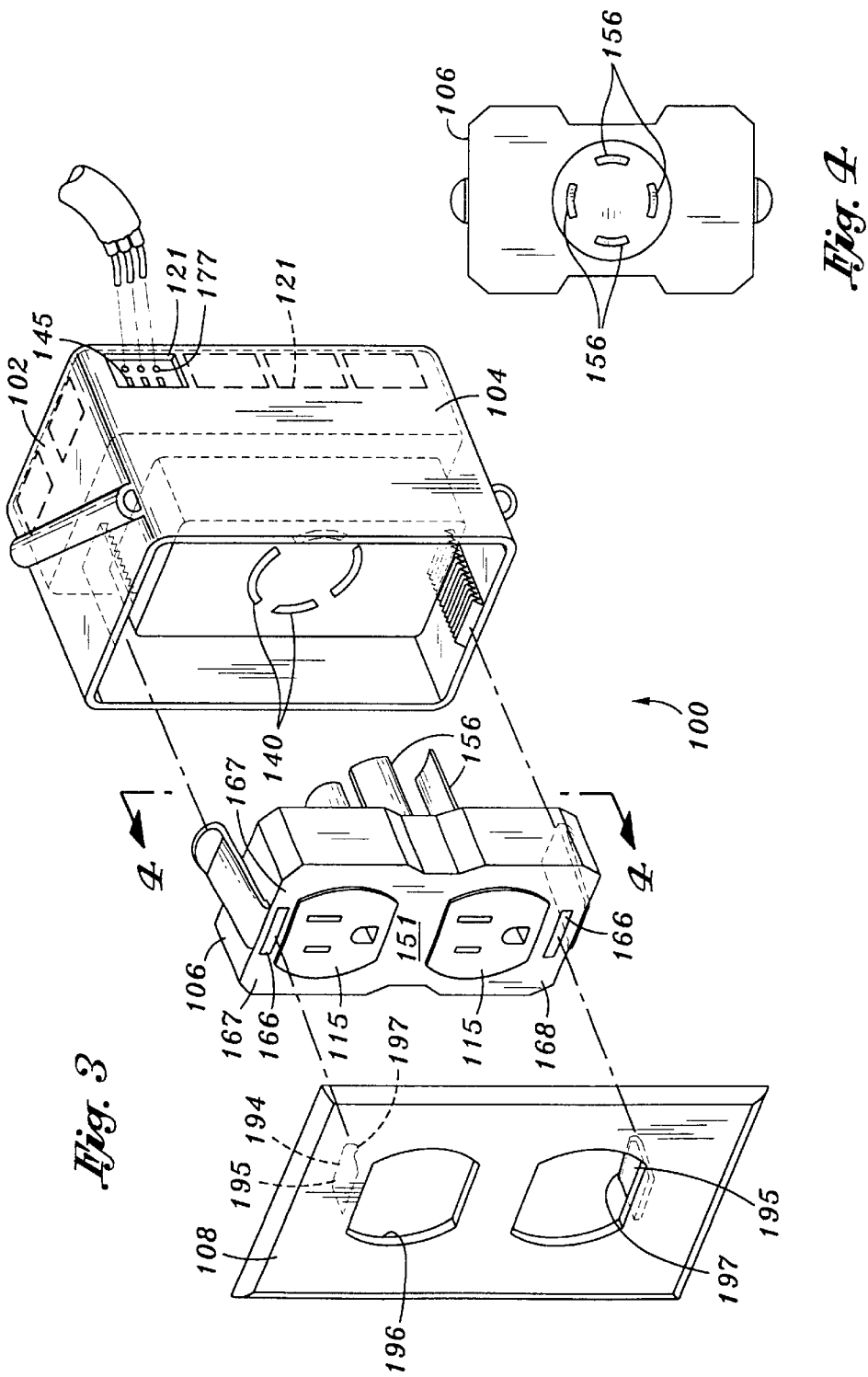

PREWIRED ELECTRICAL APPARATUS HAVING QUICK CONNECT COMPONENTS

CROSS-REFERENCE TO RELATED APPLICATIONS

This application is a continuation-in-part of application Ser. No. 09/479,632 filed Jan. 7, 2000 now abandoned.

STATEMENT RE: FEDERALLY SPONSORED RESEARCH/DEVELOPMENT (Not Applicable)

BACKGROUND OF THE INVENTION

The present invention relates generally to electric circuit components and more particularly to switches, receptacles, and other junction components which can be quicky and safely installed, thereby advantageously reducing the time and cost associated with an electrician's services.

Building construction can be expensive and time consuming because buildings are often large and because a multitude of complex tasks must often be completed. Also, renovating an existing structure can be especially expensive and time consuming for the same reasons.

One time consuming task performed during construction is electrical circuitry installation. Conventionally, an electrician positions junction boxes on the exposed studs of the building at pre-determined locations throughout the building. These junction boxes will eventually hold junction devices such as switches and outlets as will be described in greater detail below.

Next, the electrician routes wires from the circuit breaker box to the individual junction boxes, and wires are also routed between the individual junction boxes. Then, the exposed ends of individual wires positioned within the junction boxes are covered in insulating material such as a wire nut.

At this point, the electrician's tasks are suspended until city or county officials conduct a rough electrical inspection. Subsequently, drywall is attached to the exposed studs of the building frame. Also, openings are formed in the drywall to allow access to the junction boxes.

Then, after waiting for the inspection and drywall installation to be completed, the electrician is able to resume working, and he or she moves from junction box to junction box, attaching junction devices (e.g., switches and outlets) to the wires. Finally, cover plates are manually installed over the junction devices typically after painting.

Once the junction devices and cover plates are installed, final electrical inspection occurs to ensure that the components have been attached to the wires properly.

Unfortunately, several inherent problems are associated with this conventional method of electrical system installation. First, this method of electrical system installation is unduly time consuming, mainly because the electrician works both before and after the drywall is installed. Therefore, since most electricians are paid by the hour and are among the highest paid skilled laborers, electrical system installation can be very expensive.

In addition, the current prior art installation requires skilled, highly compensated electricians to install the junction devices. As such, labor costs associated with such installation is high as compared to labor costs associated with unskilled labor. Relatedly, if at a later date, the building owner wishes to change a junction device that is already installed, an electrician typically must be called on to change the junction device, and the building owner disadvantageously pays the higher labor costs for the skilled laborer.

Further, connecting and/or splicing wires using wire nuts may leave conductive material of the wires exposed. This condition may go unnoticed by the electrician during initial electrical testing, but may become more pronounced over time. Since the wires inside the junction boxes lie in close proximity, a short circuit or even a fire may result. Thus, this standard method of electrical system installation can produce unfit and unsafe electrical connections.

In addition, the junction boxes typically contain a plurality of wires, and the number of wires only increases when the circuitry is more complex, as in the case of 3-way or 4-way switched circuits. As the number of wires increases, the possibility that the electrician might incorrectly interconnect or splice the wires increases. Unfortunately, if the components are incorrectly wired, the electrician must spend costly time re-wiring. Relatedly, complex circuitry may not be able to fit inside a conventional junction box because of the number of wires and wire screws involved. In this case, a larger and more expensive junction box is disadvantageously used.

Several devices have addressed these concerns with limited degrees of success. For instance, U.S. Pat. No. 4,165, 443, issued Aug. 21, 1979, and invented by Figart, et al. discloses a power distribution system whose elements include a junction box, and a plurality of electrical bus plates contained within the junction box. As shown in Figart, the bus plates are aligned together in a stack, and a first and second set of conductive leaf springs extend from different areas of individual bus plates. Furthermore, the power distribution system also includes a junction device, such as a switch or an outlet, that comprises a plurality of conductive posts.

As shown in the Figart reference, wires are threaded into the junction box, and the first set of conductive leaf springs on the bus plates bias against the wires in order to mechanically and electrically connect the wires to the bus plates. Similarly, the junction device is positioned into the junction box such that the second set of conductive leaf springs on the bus plates biases against the conductive posts of the junction device. As such, when the junction device is positioned within the junction box, the junction device is automatically connected in the proper manner because of the specific design of the leaf springs on the bus plates. Also, different junction devices comprise varying post configurations that contact different leaf springs on the bus plates. As such, the same power distribution system is capable of creating different circuit paths, depending on which junction device is inserted. Therefore, the device disclosed in the Figart patent advantageously allows the electrician to complete electrical wiring in a more efficient manner without the need for wire splicing.

However, the device disclosed in the Figart patent does not solve all problems associated with the prior art. For instance, the junction device is attached to the junction box via a plurality of screws, and threading the screws of the junction device to the junction box can be overly time consuming and expensive considering the fact that the electrician will likely complete this task.

Also, the wires that are threaded into the junction box of the Figart device are mechanically retained by the spring force of the first set of leaf springs. In other words, the Figart reference only discloses "stab-in" wire connections. Although this connection method may be quicker than other methods, stab-in connections may be insufficient for some applications. For instance, some applications may require that the wires be retained by set screws for greater retention strength. However, the Figart device fails to disclose such a connection means.

Thus, it is appreciated that there is an ongoing need for a power distribution system configured so as to allow quick and easy circuit completion, thereby reducing construction and labor costs. Specifically, there is a need for a power distribution system that allows junction devices, such as switches and outlets, to be installed without skilled labor. Finally, there is a need for a power distribution system that allows wires to be connected in a variety of ways.

BRIEF SUMMARY OF THE INVENTION

In accordance with the present invention, a power distribution system is disclosed, comprising a junction box and a hub mounted in the cavity of the junction box. Various embodiments of the hub comprise various means of mechanically and electrically connecting each of the plurality of wires thereto including stab-in connection capability, set screws, or loop screws. The hub also comprises at least one slot and a plurality of conductive paths capable of transmitting electricity between the plurality of wires and the slot. These slots can take on a variety of configurations, depending on the building application. Moreover, the power distribution system comprises a junction device capable of being attached to the junction box via interference there between. The junction device further comprises at least one post capable of being positioned within the at least one slot of the hub to thereby provide a conductive path between the plurality of wires and the junction device. Finally, the power distribution system comprises a cover plate. The cover plate can be attached to the junction device via interference there between or the cover plate can be integrally attached to the junction device.

Advantageously, the various embodiments of the power distribution system can be installed more quickly and easily, thereby reducing costs of construction and reducing the possibility of miswiring the circuit. Also, the embodiments of the power distribution system can be used in a wider variety of construction applications.

BRIEF DESCRIPTION OF THE DRAWINGS

These as well as other features of the present invention will become more apparent upon reference to the drawings wherein:

FIG. 1 is an exploded view of a power distribution system enabling wires and junction devices to be quickly connected;

FIG. 2 is a side view of the assembled power distribution system of FIG. 1;

FIG. 3 is an exploded view of a second embodiment of a power distribution system of the present invention that enables wires and junction devices to be quickly connected;

FIG. 4 is a rear view of a junction device that is suitable for use with the embodiment of the power distribution system illustrated in FIG. 3;

DETAILED DESCRIPTION OF THE INVENTION

Figure 5:
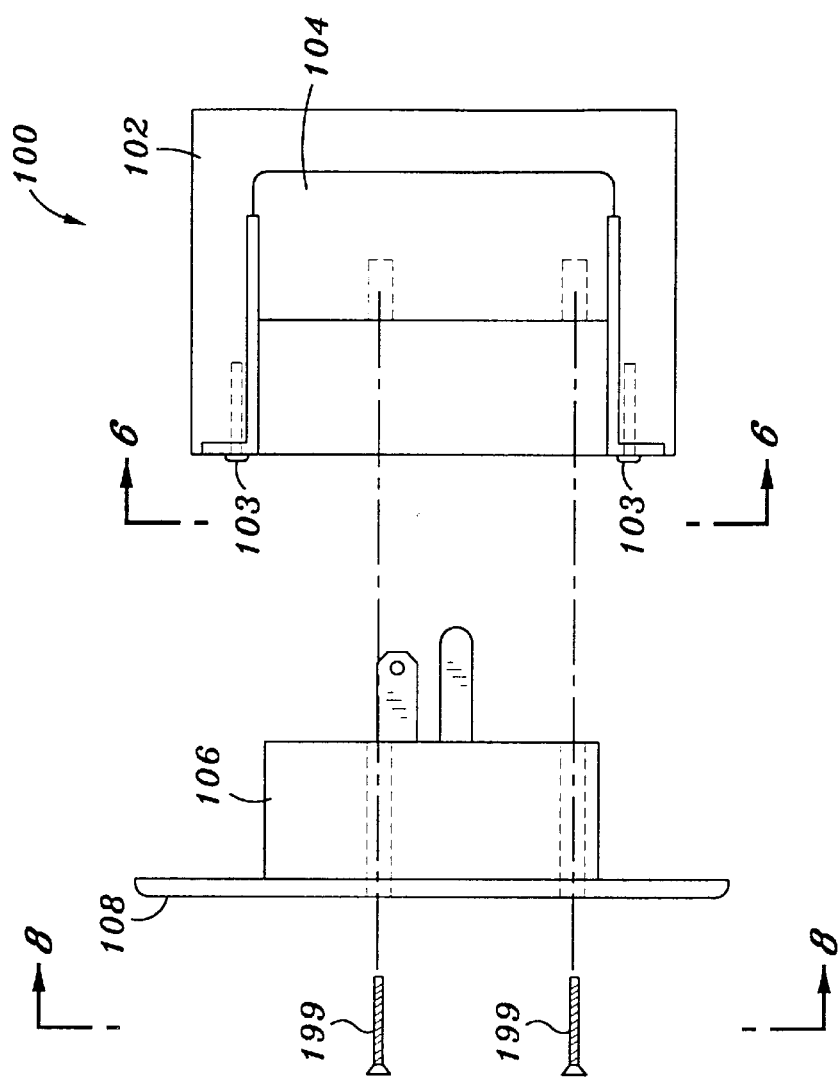
FIG. 5 is an exploded view of a third embodiment of a power distribution system of the present invention comprising an integrally connected faceplate.

Referring now to the drawings wherein the showings are for purposes of illustrating preferred embodiments of the present invention only, and not for purposes of limiting the same, FIGS. 1 and 2 illustrate one embodiment of a power distribution system 100. As shown, the power distribution system 100 comprises a junction box 102, with a wiring hub 104 positioned therein. The power distribution system 100 also comprises a junction device 106 (i.e., a switch, duplex plug, dimmer, etc.) and a cover plate 108.

As will be described in greater detail below, a plurality of wires 160 can be quickly connected electrically to the hub 104 through the junction box 102. In one embodiment, color coding is included on the junction box 102 that indicates correct wire placement and advantageously ensures proper wiring of the circuit.

Furthermore, as will be described in greater detail, the junction device 106 can be structurally connected to the junction box 102 via interference there between. This advantageously allows for quick installation of the junction device 106. Also, a variety of junction devices 106 can be electrically connected to the same hub 104. This process can be completed more quickly by an electrician, or can even be completed by non-electricians (i.e., unskilled laborers) to advantageously reduce labor costs.

Referring in more detail to FIGS. 1 and 2, the junction box 102 comprises a rectangular box comprising a top wall 120, a bottom wall 122, and a first and second side wall 124, 126, that collectively define a cavity 130 and a front opening 128 leading thereto.

The junction box further may include an interference strip 132. In the embodiment shown, the interference strip 132 comprises a plurality of unidirectional ridges 133. In one embodiment, the typical ridge 133 is a short, triangular shaped step that extends outwardly from the bottom wall 122 or top wall 120 toward the cavity 130 of the junction box 102. Preferably, the interference strip 132 comprises a plurality of ridges 133, each equally spaced apart and aligned. As will be described in greater detail below, the interference strip 132 is a means for connecting the junction device 106 to the junction box 102 in a time saving manner.

Furthermore, the junction box 102 comprises a plurality of openings 121. The openings 121 are formed in various walls of the junction box 102 and are rectangular in shape. In the embodiment shown, the openings 121 are formed by removing a predetermined rectangular section of the junction box 102. These openings 121 are commonly referred to as "punch out holes." As such, when the user needs an opening in the junction box 102 to accommodate additional wiring, the user is able to punch out an additional opening 121. Therefore, the openings 121 provide a path for a plurality of wires 160 to extend into the cavity 130 of the junction box 102.

As shown in FIGS. 1 and 2, insulative cables 117 enclosing plural wires 160 (i.e., a ground wire 161, a neutral wire 162, and a hot wire 163) extend through the openings 121 in the junction box 102. Subsequently, the individual wires 160 may be electrically connected to the hub 102 in a manner to be described in greater detail below.

As stated, the electrical circuit shown includes three wires 160. These include a ground wire 161, a neutral wire 162, and a hot wire 163, as is widely known in the art. However, those skilled in the art will recognize that the present invention additionally contemplates four-wire or specialty wiring connections.

As stated, the power distribution system 100 further comprises a hub 104 which is sized to fit within the junction box 102. In the embodiment shown, the wires 160 extend out of the insulative cables 117 and into the hub 104 in order to form the conductive circuit in the power distribution system 100. In one embodiment, the wires 160 extend into various openings 177 in the hub 104 to be retained by a biased piece of metal (not shown) to complete what is widely known as a conventional "stab-in connection." As is well known, this stab-in connection quickly completes both mechanical and electrical connection for the wires 160 to the hub 104.

It should be noted that once the wires 160 are inserted into the openings 177 of the hub 104, the electrician-required hard wiring to the junction box 102 and hub 104 is completed and rough and final electrical inspection can be performed. Thus, the electrician's services are not subsequently needed. It follows then that labor costs are advantageously reduced because the electrician is needed for less time as compared with prior art methods.

Also as shown in FIGS. 1 and 2, the power distribution system 100 may also comprise a plurality of color coding patches 145. In the embodiment shown, the patches 145 are generally square with different colors, and are individually located adjacent to respective openings 177. In the embodiment shown, there are three different color coding patches 145, and each of the three colors corresponds with the three different wires. More specifically, in one embodiment, a black color coding patch 145 corresponds with the hot wire 163, a white color coding patch 145 corresponds with the neutral wire 162, and a green color coding patch 145 corresponds with the ground wire 161. The different colored patches 145 are placed adjacent the different openings 177 to visually indicate where the individual wires 160 are to be placed in order to correctly complete the pre-determined circuit. Alternatively, indicia such as letters (not shown) may be used in place of or in addition to color coding patches 145. For instance, an "H" could be placed adjacent to openings 177 for the hot wires 163, an "N" could be placed adjacent to openings 177 for the neutral wires 162, and a "G" could be placed adjacent to openings 177 for the ground wire 161. In either embodiment, the electrician likely requires less time to install the wires 160, and is less likely to place wires 160 incorrectly. As a result, installation costs are advantageously reduced, and risks associated with miswiring are also advantageously reduced.

The hub 104 also comprises a plurality of slots 140 which in the embodiment shown, comprise thin, rectangular openings that extend perpendicularly into a front wall 136 of the hub 104. Conventional electrically conductive spring contacts 138 (schematically shown in FIG. 2) are disposed behind each slot 140. The contacts 138 are each hard wired via conventional conductors 139 to respective wire apertures 121 such that a conductive path is formed between the contacts 138 and wires 160. In the preferred embodiment, the routing of the conductive material is formed according to a pre-determined circuit layout such that different junction devices 106 (e.g., switches, duplex plugs, etc.) can be inserted into the same hub 104 without having to change the wiring pattern. For instance, a switch 150 can be replaced by a duplex outlet and function without having to change the wire 160 connections. This modular capability allows an electrician to complete the circuit in less time. Also, the modular capability allows a non-electrician (i.e., unskilled labor) to complete the circuit because the wiring is not being changed and because electrical hazards are minimal. In either case, the power distribution system 100 advantageously reduces labor costs.

As stated above, the power distribution system 100 further comprises at least one junction device 106. In the embodiment shown, the junction device 106 comprises a conventional switch 150 that is widely known in the art. As shown in FIGS. 1 and 2, the junction device 106 includes a plurality of contact posts 156. In the embodiment shown, the posts 156 comprise long, thin, rectangular members of conductive material that extend outwardly from a rear side 153 of the switch 150. Preferably, the posts 156 are sized, positioned and registered according to the size and position of the slots 140 of the hub 104. Thus, the posts 156 can be slidingly inserted into the slots 140, and as such, be electrically connected to the hub 104.

Also, it is noted that the switch 150 shown in FIG. 1 can be replaced by another junction device 106 such as a duplex outlet, a dimmer switch and the like. The replacement junction device 106 preferably has similar posts 156 that are inserted into the slots 140. This modularity allows an electrician to complete the circuit in less time, or alternatively allows a non-electrician (i.e., unskilled labor) to complete the circuit. In either case, labor costs advantageously decrease.

In the embodiment shown in FIGS. 1 and 2, the junction device 106 includes a pair of interference spring arms 170. Each interference arm 170 comprises an elongate spring member 172 and a head 174. A first end 176 of each arm 170 is attached to a top surface 190 and a bottom surface 192 of the switch 150. Each arm 170 preferably extends outwardly at a slight angle from its respective surface 190, 192. Preferably, the connection between the arm 170 and the switch 150 allows the arm 170 to flex toward and away from the switch 150. The head 174 of each of the interference arms 170 includes a triangular shaped barb sized to engage the ridges 133 of the interference strip 132 formed on the junction box 102.

In the preferred embodiment, when the posts 156 of the junction device 106 are inserted into the slots 140 of the hub 104, interference between the heads 174 and the ridges 133 cause the interference arms 170 to flex inwardly toward each other. When the junction device 106 is further advanced into the hub 104, the flexure is enough to allow the heads 174 to slide over the ridges 133. Further advancement of the junction device 106 causes interference arms 170 to return to an unflexed state where the heads 174 reside between individual ridges 133. In this position, removal of the junction device 106 is impeded by interference between the heads 174 and the ridges 133. Preferably, the posts 156 of the junction device 106 are advanced completely within the slots 140 to complete the circuit, and the interference arms 170 further retain the junction device 106. As such, the interference arms 170 allow the junction device 106 to be assembled into the power distribution system 100 quickly and easily. Thus, if an electrician performs this task, labor costs will be advantageously reduced due to time savings. Alternatively, if unskilled labor performs this task, the installation will be advantageously more convenient.

As shown in FIGS. 1 and 2, the power distribution system 100 further contemplates a cover plate 108 that is widely known in the art. The cover plate 108 also comprises a plurality of retention holes 182 through which screws (not shown) attach the cover plate 108 to the junction device 106. Once attached, the cover plate 108 substantially limits access to the internal components of the power distribution system 100 and makes the fully assembled power distribution system more aesthetically pleasing.

In summary of FIGS. 1 and 2, the color coding and the stab-in connection means on the hub 104 allows an electrician to quickly wire the hub 104 and complete the circuitry work in a manner that reduces the chances of miswiring the circuit. At this point, the electrician's services are no longer necessary. Thus, the power distribution system 100 reduces labor costs by allowing quick installation, reducing the chances of miswiring, and by reducing the time that an electrician is needed. Also, the interference arms 170 and the modular nature of the junction device advantageously a variety of junction devices 106 to be quickly installed. Thus, the circuitry can be advantageously completed more conveniently and quickly, usually by non-electricians.

Turning now to FIGS. 3 and 4, an additional embodiment of the power distribution system 100 is illustrated. As shown, this embodiment of the power distribution system 100 also comprises a junction box 102, a hub 104, a junction device 106, and a cover plate 108.

Furthermore, the hub 104 comprises a plurality of slots 140. In this embodiment, the slots 140 are shaped as arcuate slots and the slots 140 are arranged in a circle.

Additionally, as shown in FIGS. 3 and 4, in this embodiment, the junction device 106 is illustrated as a duplex outlet 115, which is widely known in the art. It will be appreciated, however, that the outlet 115 could be interchanged with a switch 150 or other similar component without departing from the spirit of the invention.

Also, as shown in FIG. 4, in this embodiment, the posts 156 on the junction device 106 comprise arcuated members, and are arranged in a circle so as to register with the slots 140. Preferably, the posts 156 of various junction devices 106 are capable of being inserted to the same slot 140 configuration. As such, if an electrician performs the installation, then the electrician advantageously spends less installation time, and installation costs are advantageously reduced. Also, this enables a person that is not trained as an electrician to change the junction device 106, and installation costs are likely eliminated.

As shown in FIGS. 3 and 4, the junction device 106 further includes a pair of cover plate slots 166. In one embodiment, the cover plate receptacles 166 are rectangular slots that extend perpendicularly from a front side 151 of the junction device 106. In the embodiment shown, there are two cover plate receptacles 166, located at a top end 167 and a bottom end 168 of the junction device 106, respectively. As will be described in more detail below, the cover plate receptacles 166 provide a convenient means for attaching the cover plate 108.

The cover plate 108 of FIG. 3 is substantially similar to the cover plate 108 of FIGS. 1 and 2 except that the cover plate 108 comprises a plurality of engagement spring arms 195. The engagement arms 195 are rectangular members which extend outwardly from the back side 196 of the cover plate 108 such that the engagement arms 195 are able to align with the cover plate receptacles 166. In one embodiment, the engagement arms 195 each include a barbed head 197, which is short and thicker than the other portions of the engagement arms 195. Each head 197 is located at a first end 194 of the engagement arms 195. As such, when the engagement arms 195 are aligned with the cover plate receptacles 166, and the cover plate 108 is moved toward the junction device 106, the heads 197 contact the periphery of the receptacles 166, causing the engagement arms 195 to flex. As the cover plate 108 is advanced further, the flexure in the engagement arms 195 allows the heads 197 to move into the receptacles 166, and the engagement arms 195 unflex once the heads 197 enter the receptacles 166. In the preferred embodiment, the internal cross section of each receptacle 166 is such that the engagement arms 195 effectively lock into the receptacles 166 due to interference there between.

As such, the cover plate 108 can be assembled into the power distribution system 100 in a timely manner, without the need for screws or other separate retaining devices. Thus, installation time and costs associated therewith advantageously decrease.

Turning now to FIGS. 5 through 8, an additional embodiment of the power distribution system 100 is illustrated. As shown, the power distribution system 100 comprises a conventional junction box 102 and a removably mounted hub 104. The hub 104 is mounted via conventional threaded fasteners 103 to the conventional junction box 102. Also, in this embodiment, the cover plate 108 is integrally formed or attached to the junction device 106. As such, assembly of the junction device 106 takes less time because the cover plate 108 does not require separate attachment. Thus, installation time and associated costs advantageously decrease.

Figure 6:
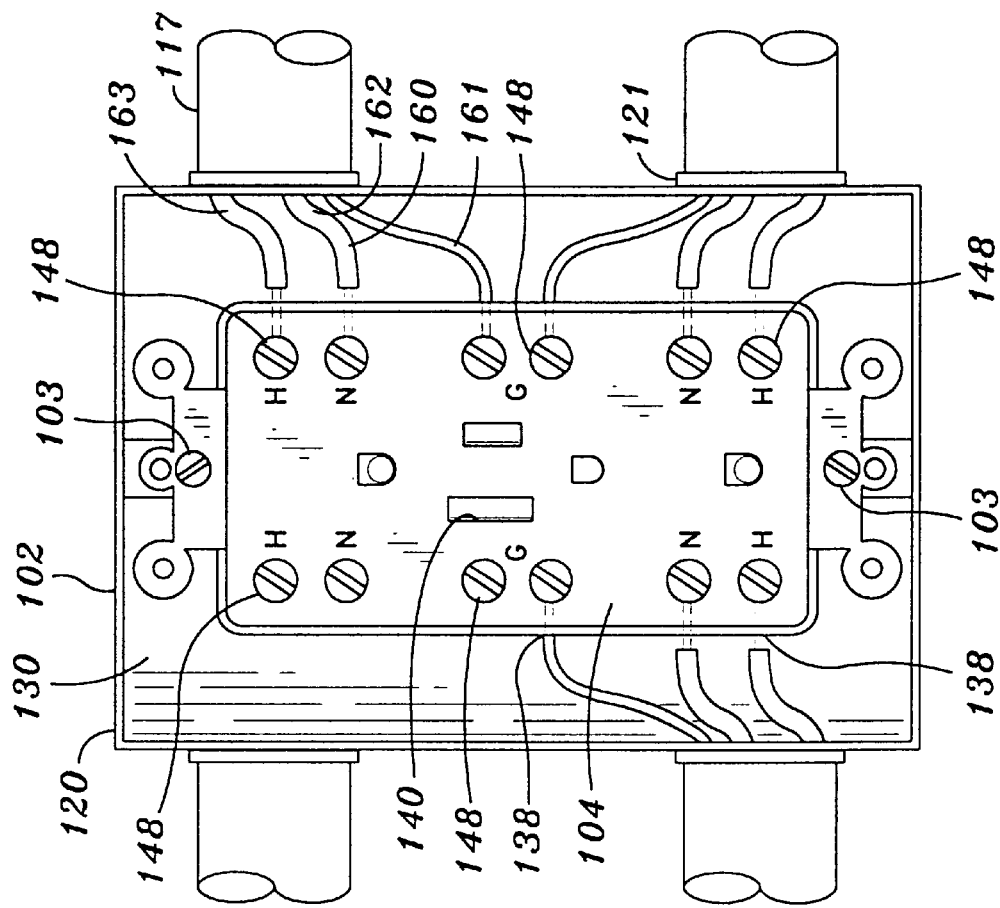
FIG. 6 is a front view of a hub of FIG. 5.

As shown in FIG. 6, the hub 104 includes a set of slots 140 with various sizes. Although the slots 140 vary in size, shape, and arrangement, these slots 140 function in the same manner as the slots 140 of FIGS. 1–4.

As shown, the slots 140 of FIG. 6 are arranged according to a standard duplex outlet, such that conventional power tools and appliances can be readily plugged into the hub 104 directly. As such, since the circuit is completed once the wires 160 are inserted into the hub 104, construction workers can advantageously draw power directly from the hub 104 both before and after drywall is installed, thereby adding convenience at the construction site.

Moreover, in the embodiment shown in FIG. 6, the hub 104 may include a plurality of set screws 148. The set screws 148 are widely known in the art for being rotatably mounted on a surface wherein rotation of the set screw 148 advances the set screw 148 toward or away from the mounting surface. When a wire 160 is positioned within the hub 104, rotation of the set screw 148 presses the wire 160 against a conductive surface. As such, the wire becomes electrically and mechanically attached within the circuit.

It is appreciated that the set screws 148 could be replaced with conventional loop screws terminals (not shown) without departing from the spirit of the invention. In one embodiment, the loop screws would be arranged in the same position as the set screws 148, and each wire 160 would be partially wound around each loop screw. Rotation of the typical loop screw would cause the associated wire 160 to be compressed between the loop screw and a conductive surface to thereby mechanically and conductively attach the wire 160 and complete the pre-determined conductive path of the circuit.

Figure 8:
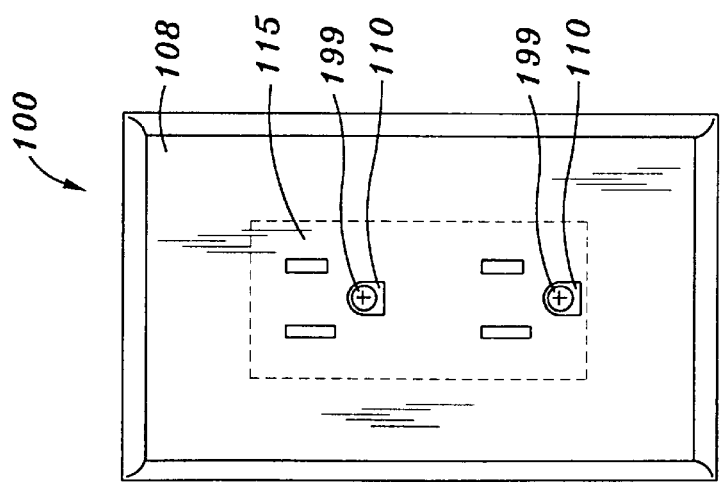
FIG. 8 is a front view of the assembled power distribution system of FIG. 5.
Figure 7:
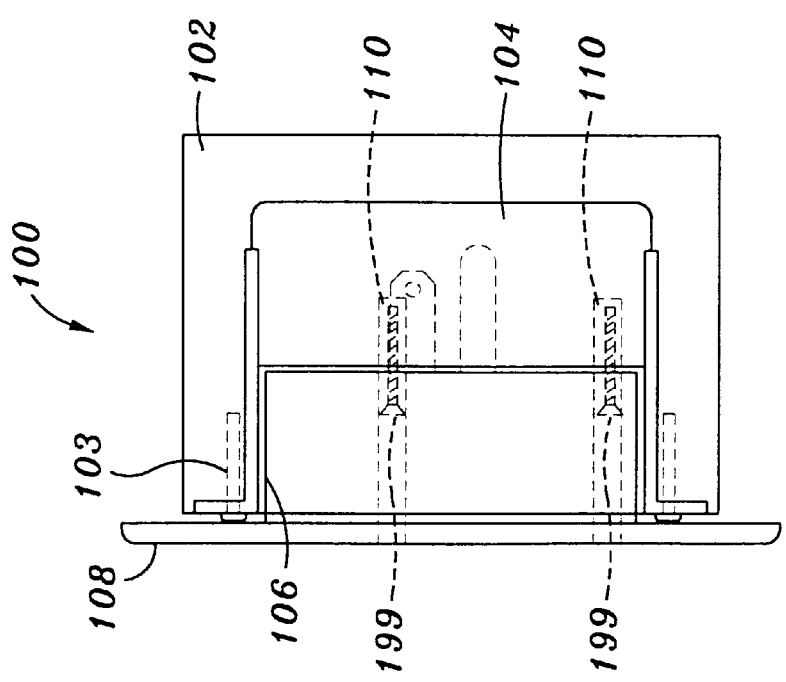
FIG. 7 is a side view of the assembled power distribution system of FIG. 5.

Turning now to FIGS. 7 and 8, the power distribution system 100 of FIGS. 5 and 6 is shown in an assembled state. After the hub 104 is joined to the junction box 102 as described above, the junction device 106 with the integrally attached cover plate 108 is mounted to the hub 104. In the embodiment shown, screws 199 attach the junction device 106 to the hub 104. More specifically, a single screw 199 is threaded through one or both of a plurality of ground receptacles 110 on the outlet 115. As such, the screws 199 involved in assembling the power distribution system 100 are shielded from view. Thus, the surfaces of the power distribution system 100 are more uniform in appearance, and are likely more aesthetically pleasing.

Also, it is noted that the cover plate 108 does not require separate attachment because it is integrally attached to the junction device 106. Thus, time needed to assemble the power distribution system 100 is likely reduced. Advantageously, electrician costs are reduced if an electrician performs the installation, or the assembly becomes more convenient if another performs the installation.

Figure 9:
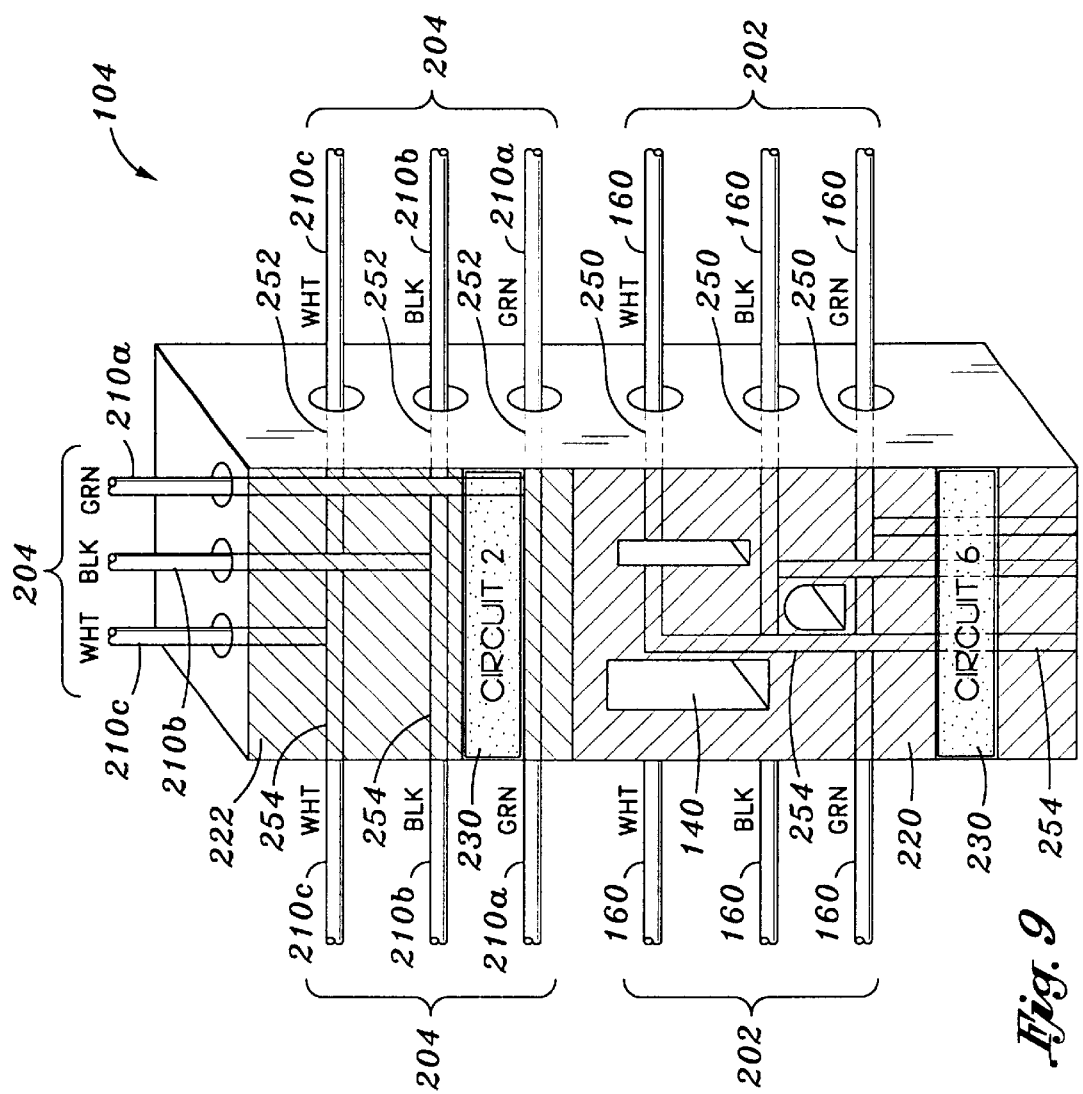
FIG. 9 is a perspective view of a hub comprising isolated circuitry and visual indicators.

Finally, turning to FIG. 9, an additional embodiment of the hub 104 is illustrated. The hub 104 is preferably dimensioned so that it can be positioned within the junction box 102 similar to the embodiments described above. Also, the hub 104 comprises a first set of wires 202 that are mechanically and electrically connected to the hub 104. The first set of wires 202 is similar to the wires 160 illustrated in previous Figures and described above. Furthermore, the hub comprises a slot 140 by which a junction device 106 may be electrically connected to the hub 104. A first set of conductive paths 250 are also included inside the hub 104 in a manner that allows electricity to flow between individual wires in the first set of wires 202 and the slot 140.

As shown in FIG. 9, the hub 104 also comprises a second set of wires 204. In the embodiment shown, the second set of wires 204 include three different input wires 210*a*, 210*b*, 210*c* and two pair of related output wires 211*a*, 211*b*, 211*c*. The second set of wires 204 are mechanically and electrically attached to the hub 104 via a stab-in connection, a set screw connection, a loop screw connection, or another similar means. The hub 104 further comprises a second set of conductive paths 252 that allow electricity to flow from the input wires 210*a*, 210*b*, 210*c* to their respective output wires 211*a*, 211*b*, 211*c*.

In the preferred embodiment, the second set of conductive paths 252 are electrically insulated from the first set of conductive paths 250. As such, electricity in the first set of wires 202 flows independently of the electricity in the second set of wires 204. Thus, the hub 104 shown in FIG. 9 allows two distinct circuits to be formed (i.e., one circuit that includes the first set of wires 202 and a second circuit that includes the second set of wires 204). Advantageously, the hub 104 adds convenience to the electrical wiring process because the hub 104 can be used to connect the second set of wires 204 quickly and easily and with a lesser chance of wiring the system incorrectly. It is understood that one skilled in the art could modify the hub 104 to include additional isolated circuits without departing from the spirit of the invention.

In the embodiment shown, the hub is split into a first area 220 and a second area 222. The first area 220 is defined by the lower portion of the hub 104, and the first set of wires 202 are grouped and attached adjacent to the first area 220. In contrast, the second area 222 is defined by the upper portion of the hub 104, and the second set of wires 204 are grouped and attached adjacent to the second area 222. Also, in the embodiment shown, the first area 220 is visually distinguishable from the second area 222 to thereby allow a user to distinguish between the two associated circuits. In the embodiment shown, the first area 220 is colored differently than the second area 222 to thereby allow the user to visually distinguish between the areas 220, 222. In another embodiment, printed symbols are included over one of the areas 220, 222 to thereby distinguish the two areas 220, 222. Advantageously, the distinction between the first and second areas 220, 222 reduces the likelihood of incorrect wiring.

Also, the hub 104 comprises a plurality of wiring schematics 254. In one embodiment, the wiring schematics 254 are lines that are painted on the exterior surface of the hub 104, and the wiring schematics 254 are oriented according to the orientation of the conductive paths 250, 252 located inside the hub 104. As such, the wiring schematics 254 effectively indicate the interconnections among the wires 160 and, advantageously, incorrect wiring becomes less likely.

Moreover, the hub 104 comprises a writable area 230. In the embodiment shown, the typical writable area 230 is a surface on the exterior of the hub 104 upon which a user may make marks with a writing utensil. As such, the writable area 230 allows a user to make notes directly on the hub 104. Advantageously, when the user wires the power distribution system 100, the user is very likely to see important notes that might be marked in the writable area 230 because the notes are directly on the hub 104.

This disclosure provides exemplary embodiments of the present invention. The scope of the present invention is not limited by these exemplary embodiments. Numerous variations, whether explicitly provided for by the specification or implied by the specification, such as variations in structure or dimension, may be implemented by one of skill in the art in view of this disclosure.

What is claimed is:

1. A power distribution system comprising:
    a junction box comprising a plurality of walls attached so as to define a cavity and at least one opening formed in at least one wall and extending there through;
    a first set of wires extending into the junction box through the at least one opening;
    a second set of wires extending into the cavity of the junction box through the at least one opening;
    a hub mounted in the cavity of the junction box, wherein the hub permits visual inspection of the first and second sets of wires without disassembly of the hub, the hub further comprising:
        a means of mechanically and conductively attaching the first and second sets of wires to the hub,
        at least one slot,
        a plurality of first conductive paths forming a first electric circuit with the at least one slot and individual wires of the first set of wires, and
        a plurality of second conductive paths forming a second electric circuit with individual wires of the second set of wires, wherein the first and second circuits are electrically isolated from each other; and
    a junction device slidably attaching to the junction box wherein the junction device further comprises at least one post for positioning within the at least one slot of the hub to thereby complete the first electric circuit.

2. The power distribution system of claim 1, wherein the junction device comprises a switch.

3. The power distribution system of claim 1, wherein the junction device comprises an outlet.

4. The power distribution system of claim 1, further comprising a cover plate attached to the junction device via interference there between, wherein the cover plate exhibits no visible means of attachment while the cover plate is attached to the junction device.

5. The power distribution system of claim 1, wherein the junction device further comprises an integrally-attached cover plate.

6. The power distribution system of claim 1, wherein the hub further includes a plurality of screws that compress each wire of the first and second sets of wires against a conductive surface on the hub to thereby mechanically and conductively attach each of the wires to the hub.

7. The power distribution system of claim 1, further comprising a plurality of color coding patches that correspond to individual wires in the first set of wires, wherein the plurality of color coding patches is arranged so as to indicate proper wiring of a pre-determined circuit design.

8. The power distribution system of claim 1, further comprising a plurality of letters that correspond to individual wires in the first set of wires, wherein the plurality of letters is arranged so as to indicate proper wiring of a pre-determined circuit design.

9. The power distribution system of claim 1, wherein the at least one post is arranged in an arcuate configuration.

10. The power distribution system of claim 1, wherein the at least one post is arranged in a conventional duplex configuration.

11. The power distribution system of claim 1, wherein the hub further comprises a first area and a second area, wherein the first area is visually distinguishable from the second area, and wherein the first area corresponds to the first set of wires and the second area corresponds to the second set of wires, so as to visually distinguish the first set of wires from the second set of wires.

12. The power distribution system of claim 11, wherein the first area is distinguishable from the second area because the first and second areas are colored differently.

13. The power distribution system of claim 11, wherein the first area is distinguishable from the second area because of a distinguishing symbol located on the hub.

14. The power distribution system of claim 1, further comprising a first wiring schematic on an exterior surface of the hub that corresponds with the first conductive paths, so as to visually indicate the first conductive paths of the first electric circuit.

15. The power distribution system of claim 14, further comprising a second wiring schematic on the exterior surface of the hub that corresponds with the second conductive paths, so as to visually indicate the second conductive paths of the second electric circuit.

16. The power distribution system of claim 1, further comprising a writing surface upon which a user may make markings.

17. The power distribution system of claim 1, wherein the junction device is attached to the junction box via interference there between.

* * * * *